United States Patent
Tomaselli et al.

(10) Patent No.: US 8,520,969 B2
(45) Date of Patent: Aug. 27, 2013

(54) DIGITAL IMAGE PROCESSING APPARATUS AND METHOD

(75) Inventors: Valeria Tomaselli, Belpasso (IT); Mirko Guarnera, Gela (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1020 days.

(21) Appl. No.: 12/547,006

(22) Filed: Aug. 25, 2009

(65) Prior Publication Data

US 2011/0052053 A1    Mar. 3, 2011

(51) Int. Cl.
    *G06K 9/40*    (2006.01)
(52) U.S. Cl.
    USPC ............ 382/262; 348/650; 358/518; 358/529
(58) Field of Classification Search
    None
    See application file for complete search history.

(56) References Cited

U.S. PATENT DOCUMENTS

| | | | |
|---|---|---|---|
| 7,529,405 B2 | 5/2009 | Masuno et al. | |
| 2006/0017855 A1* | 1/2006 | Yamada | 348/650 |
| 2006/0098253 A1* | 5/2006 | Masuno et al. | 358/518 |
| 2007/0153341 A1* | 7/2007 | Kang | 358/529 |

FOREIGN PATENT DOCUMENTS

JP    2006014261 A    *    1/2006

OTHER PUBLICATIONS

V. Tomaselli et al., "False colors removal on the YCrCb color space," Jan. 20, 2009, pp. 72500C-1-72500C-10, SPIE-IS&T, vol. 7250.

* cited by examiner

*Primary Examiner* — Tsung-Yin Tsai
(74) *Attorney, Agent, or Firm* — Seed IP Law Group PLLC

(57) ABSTRACT

An image processing apparatus suitable for processing a digital image in YCrCb color space, the image having an initial luminance plane Y and two initial Cr, Cb chrominance planes, the processing apparatus including a first block that receives the initial luminance plane Y of the digital image and processes and modifies the initial luminance plane Y in order to provide a modified luminance plane Y in output; a color artifact correction block, operating in parallel with the first block, the correction block receiving the initial planes Y, Cr, Cb of the image and modifying the initial chrominance planes Cr and Cb through a pixel by pixel processing approach with a mobile working window, the correction block having a false colors correction sub-block and a purple fringing correction sub-block, or both, the sub-blocks structured to modify values of the initial Cr, Cb chrominance planes based on information contained in the initial Cr, Cb chrominance planes and also based on information contained in the initial luminance plane Y.

30 Claims, 6 Drawing Sheets

DIGITAL IMAGE PROCESSING APPARATUS AND METHOD

BACKGROUND

1. Technical Field

The present disclosure refers to the technical field of digital signal processing and, in particular, it pertains to an apparatus and method for processing digital images.

2. Description of the Related Art

It is felt that there is a need to improve the quality of a digital image and, in particular, to reduce or eliminate the effects of degradation of the quality of the image due to the presence of color artifacts.

A first type of color artifact is represented by so-called false colors. These are artifacts essentially introduced into the digital image by the interpolation or demosaicing process, suitable for obtaining a digital image in RGB format from a digital image in CFA format.

A second type of color artifact is represented by so-called purple fringing. These are artifacts introduced into the digital image essentially for optical reasons, and in particular they are essentially, but not exclusively, due to the chromatic aberration of the lens of the digital image acquisition device, like for example a camera.

Most image processing techniques of the state of the art aimed at correcting, i.e., reducing or eliminating, color artifacts of the first type indicated above, i.e., false colors, carry out a blurring of the chrominance planes because the problem of false colors is essentially down to incorrect interpolation of the chrominance planes. The aforementioned approach of the state of the art does, however, have the drawback of not distinguishing the false colors from genuine chrominance details, for which reasons it also introduces an undesired color loss of the colored sharp edges.

On the other hand, as regards color artifacts of the second type indicated above, i.e., purple fringing, some of the correction techniques belonging to the state of the art are based on identifying the areas of the image affected by such a defect and on desaturation of them executed on the chrominance planes. U.S. Pat. No. 7,529,405 describes a method aimed at correcting color artifacts and, more specifically, purple fringing, and avoiding excessive reduction of the saturation.

BRIEF SUMMARY

The present disclosure provides a processing apparatus that allows color artifacts and, in particular, false colors and purple fringing, to be corrected, i.e., reduced or eliminated, and that can be implemented in a post-processing system having low complexity and with low requirements in terms of memory use.

This purpose is accomplished through a processing apparatus as defined in the attached claim 5.

The present disclosure is also directed to a system, a method, and to a computer program product as defined, respectively, in the description and the claims.

In accordance with one embodiment of the present disclosure, an image processing apparatus is provided that includes a first block structured to receive in input the initial luminance plane Y of the digital image and to process and modify the initial luminance plane Y in order to provide a modified luminance plane Y in output; a color artifact correction block, operating in parallel with the first block, the correction block structural to receive in input the initial planes Y, Cr, Cb of the image, to modify the initial chrominance planes Cr and Cb through a pixel by pixel processing approach with a mobile working window, the correction block comprising at least one of a false colors correction sub-block and a purple fringing correction sub-block, the sub-blocks structured to modify values of the initial Cr, Cb chrominance planes based on information contained in the initial Cr, Cb chrominance planes and also based on information contained in the initial luminance plane Y.

In accordance with another aspect of the present disclosure, a digital image acquisition and processing system is provided that includes a first block structured to receive in input the initial luminance plane Y of the digital image and to process and modify the initial luminance plane Y in order to provide a modified luminance plane Y in output; a sub-sampling block, arranged in parallel with the first block, which precedes the correction block and provided for sub-sampling the initial luminance and chrominance planes Y and Cr, Cb before they are received in input at the correction block; a color artifact correction block, operating in parallel with the first block, the correction block structural to receive in input the initial planes Y, Cr, Cb of the image, to modify the initial chrominance planes Cr and Cb through a pixel by pixel processing approach with a mobile working window, the correction block comprising at least one of a false colors correction sub-block and a purple fringing correction sub-block, the sub-blocks structured to modify values of the initial Cr, Cb chrominance planes based on information contained in the initial Cr, Cb chrominance planes and also based on information contained in the initial luminance plane Y; a selection block of a working window around a pixel to be corrected of the image; a median filtering block of the planes Cr and Cb, suitable for obtaining in output two filtered chrominance values mCr, mCb for such a pixel to be corrected obtained by considering pixels belonging to the working window; a median filtering modulation block suitable for modulating the strength of the filtering based on dynamic luminance and chrominance ranges DY and DCr, DCb, calculated on the working window, the median filtering modulation block being such as to modulate the filtering so as to determine a resulting filtering that is relatively strong at a sharp edge of the image in the working window and relatively weak otherwise.

In accordance with yet a further aspect of the present disclosure, an imaging processing method is provided that includes the following steps: a cross-correlation block, suitable for detecting, based on the dynamic ranges, an opposite correlation condition between the Cr, Cb chrominance planes; and a weighted filtering block suitable for modifying the chrominance values of the pixel to be processed by executing weighted averages of chrominance values of pixels belonging to the working window, the weighted averages being executed according to weight coefficients calculated so that more pixels of the window that have smaller luminance differences contribute in the weighted averages than the pixels to be processed; wherein the cross-correlation block is such as to supply an output control signal adapted to activate the weighted filtering block instead of the median filtering block and the modulation block in the case in which the opposite cross-correlation condition is detected or to activate the median filtering block and the modulation block otherwise.

In accordance with a further embodiment of the present disclosure, a computer program product is provided to be executed on a processing system that includes a memory, a processor, and the computer product having code instructions that, when loaded in the memory, are such as to make the processor implement a processing method for outputting an image with improved color characteristics. The product is such as to make the processor implement a processing method that includes a first step of processing the luminance plane Y intended to produce a modified luminance plane Y; a step of correcting color artifacts, executed in parallel with the first step and such as to modify the chrominance planes Cr and Cb, in accordance with a pixel by pixel processing approach with a mobile working window, the correction step comprising at least one of a false colors correction sub-step and a purple fringing correction sub-step, the sub-steps modifying the values of the initial Cr, Cb chrominance planes based on information contained in the initial Cr, Cb chrominance planes and also based on information contained in the initial luminance plane Y; and also comprising a sub-sampling step, executed in parallel with the first step and that precedes the correction step, wherein an operation of sub-sampling the initial luminance and chrominance planes Y and Cr, Cb is executed before they are processed in the correction step.

BRIEF DESCRIPTION OF THE SEVERAL VIEWS OF THE DRAWINGS

Further characteristics and advantages of the disclosure shall become clearer from the following description of a preferred but not limiting embodiment thereof, given with reference to the attached figures, in which.

In the figures identical or similar element shall be indicated with the same reference numerals/symbols.

It should be kept in mind that in the block diagrams represented in the aforementioned figures the blocks and sub-blocks are representative of hardware and software modules, and therefore the aforementioned block diagrams constitute schematized representations both of a processing apparatus and method, the blocks in the latter case representing steps or sub-steps of the processing procedure. For this reason, for the sake of avoiding unnecessary repetition, a separate description of the processing apparatus and method, respectively, will not be given, and the focus in the present description will be on describing the architecture of the processing apparatus. The description of the method will be given automatically through the description of the functionalities of the apparatus and of the processing steps and sub-steps executed through its component blocks and sub-blocks.

DETAILED DESCRIPTION

Figure 1:
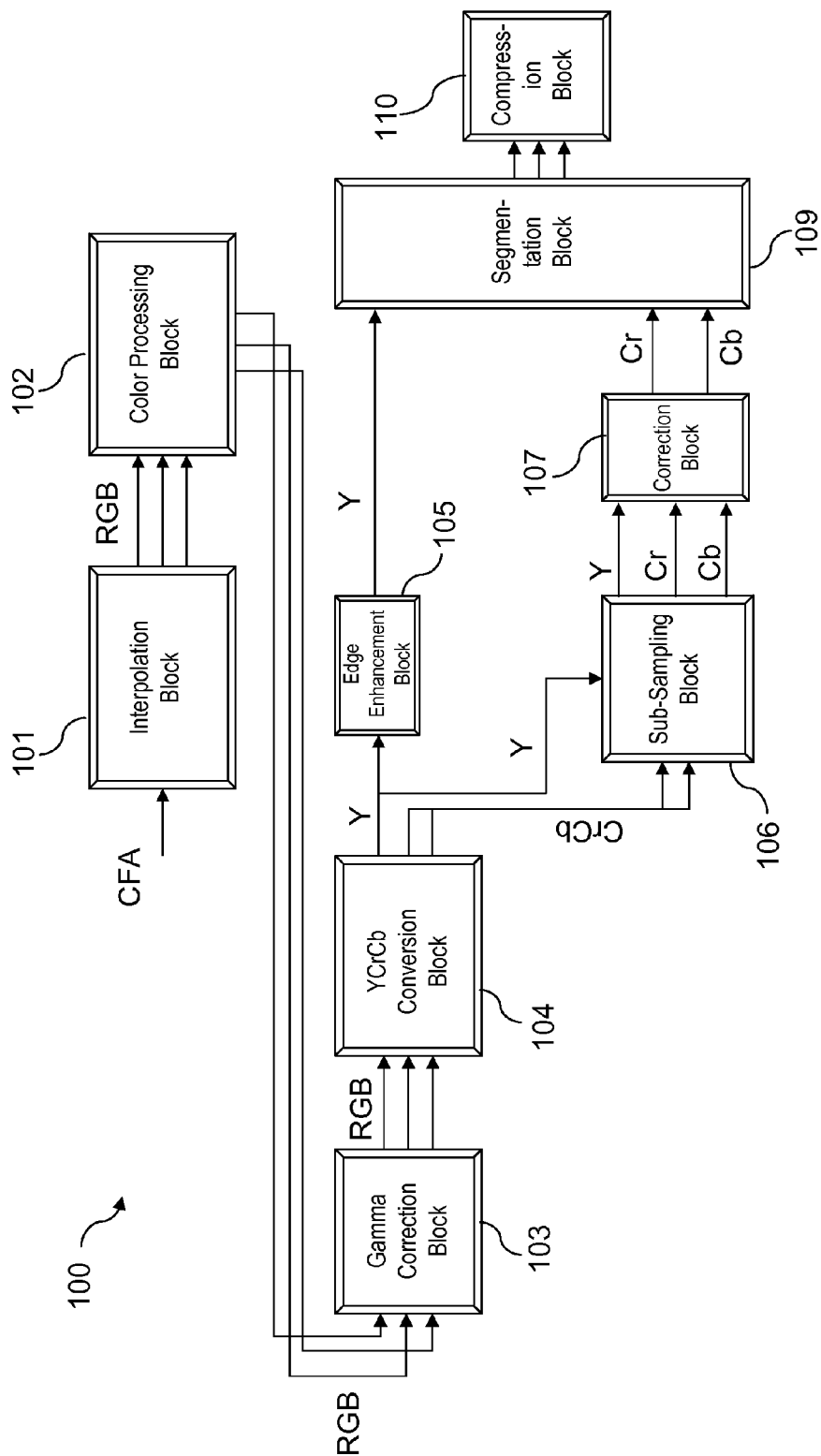
FIG. 1 shows the functional block diagram of one possible configuration of a digital image processing apparatus, in which a correction block is provided that is adapted for implementing a processing method aimed at correcting color artifacts in a digital image.

With reference to FIG. 1, the block diagram of one configuration of a digital image processing apparatus 100 is shown, comprising an interpolation block 101, adapted for receiving in input a digital image in CFA (Color Filter Array) format to execute a processing step in order to supply in output a digital image in RGB (Red-Green-Blue) format. For example, the aforementioned CFA format is a CFA Bayern format.

The processing apparatus 100 also comprises, connected together in cascade and in output from the interpolation block 101, a color processing block 102, suitable for executing a color correction step of the RGB image (such correction is known in the field by the name Color Matrix), a gamma correction block 103, and a YCrCb conversion block. The latter is adapted for receiving in input a digital image in RGB format to supply in output a digital image in YCrCb color space, wherein Y indicates the luminance plane and Cr, Cb indicate the chrominance planes. Henceforth, the YCrCb image produced in output from block 104 will also be referred to using the expression "initial YCrCb image", the initial image being formed from Y, Cr, Cb planes to which shall be referred to hereafter using the expression "initial Y, Cr, Cb planes".

All of the blocks 101-104 described above are well known to those skilled in the art and for this reason they shall not be detailed any further in the present description. In the case in which the processing apparatus 100 is integrated in a digital image acquisition and processing system, for example, a digital camera, the digital image in CFA format can be supplied to the interpolation block 101, directly or indirectly, by an optical image acquisition sensor, for example, a CCD, which is not shown in the figures. In an alternative embodiment, the processing apparatus 100 could be an apparatus, for example, a common personal computer into the memory of which an information technology product is loaded, suitable for receiving the digital image to be processed from a memory, like for example a RAM or a Flash memory, or from a telecommunications network, at any stage of the processing chain that goes from blocks 101 to 104, since they have been introduced into the particular apparatus 100 described only as an example.

As shown in FIG. 1, the processing apparatus 100 also comprises, connected in output to the conversion block 104, a block 105 structured to receive in input the initial luminance plane Y of the initial image in YCrCb color space and to process and modify the plane in order to provide a modified luminance plane Y in output. Preferably, block 105 is an edge-enhancement block 105, suitable for processing and modifying the luminance plane Y. A block 105 of the aforementioned type can be made according to ways known to those skilled in the art, and for this reason it shall not be described any further.

The processing apparatus 100 also preferably comprises a sub-sampling block 106, suitable for executing a sub-sampling operation of the initial planes Cr and Cb and suitable for receiving and sub-sampling, for reasons that will be explained in more detail herein below, the initial luminance plane Y. Such a sub-sampling block is preferably arranged in parallel with the processing block 105 of the luminance plane Y.

The processing apparatus 100 also advantageously comprises a correction block 107 provided for correcting color artifacts by processing and modifying the Cr, Cb chrominance planes according to operations that advantageously are executed also based on information contained in the luminance plane Y. This can be understood from the scheme of FIG. 1 due to the fact that the initial luminance plane Y is sent in parallel both with block 105, to be processed and modified by such a block 105, and with blocks 106 and 107, which are intended to process and modify the initial Cr, Cb chrominance planes also exploiting information contained in the initial luminance plane Y.

Finally, in accordance with a possible embodiment, the processing apparatus 100 comprises a segmentation block 109 of the digital image as processed in Y, Cr, Cb format, an MCU (Minimum Compression Unit) and a compression (or entropy encoding) block 110. For example, the compression block 110 is a JPEG encoding/compression block.

It should be observed that, advantageously, the correction of color artifacts based on the processing of Cr, Cb chrominance planes through the correction block 107 can be carried out simultaneously with the processing carried out on the initial luminance plane Y through block 105. In practice, the luminance plane Y is not modified by blocks 106 and 107 but sent to them to modulate the processing of the Cr, Cb chrominance planes.

Figure 2:
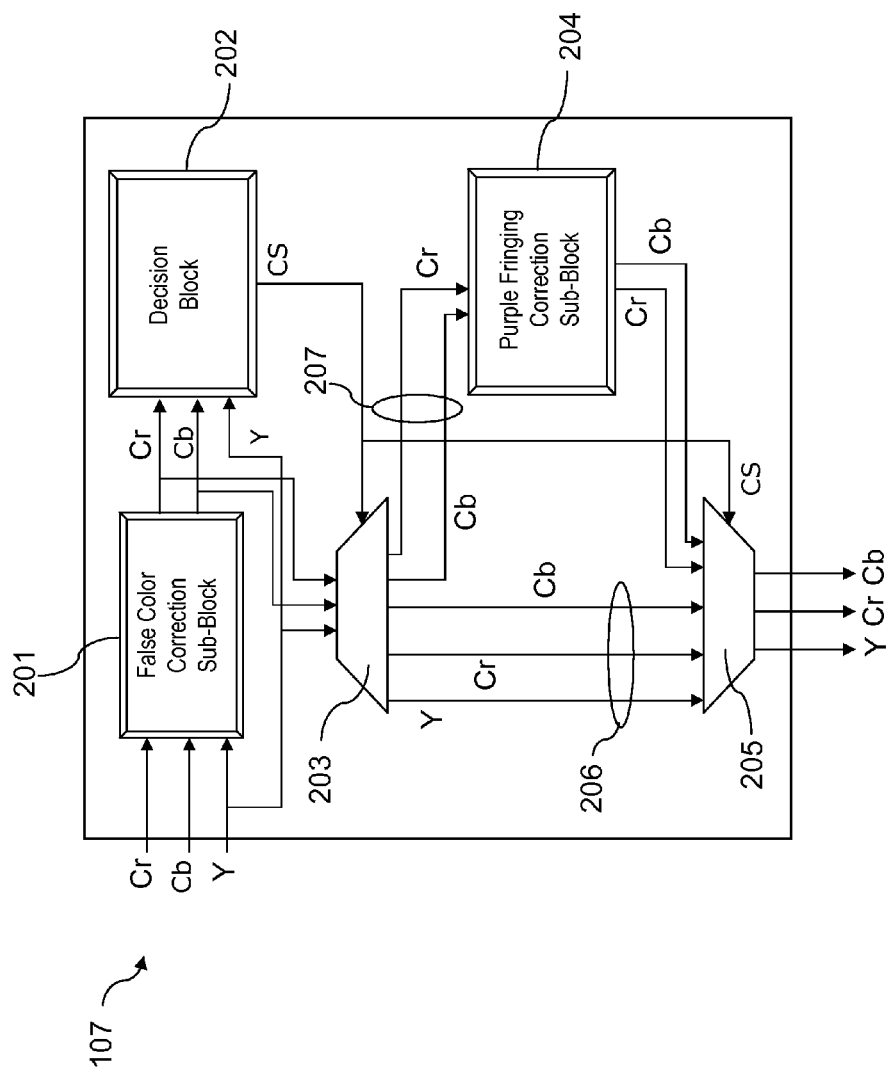
FIG. 2 shows an exemplary block diagram of the correction block of FIG. 1, in accordance with a first embodiment.

FIG. 2 shows a general block diagram of the correction block 107 in accordance with a first possible embodiment. The correction block 107 advantageously comprises:
a false colors correction sub-block 201; and/or
a purple fringing correction sub-block 204.

Henceforth the sub-blocks 201, 204 will also be indicated more simply as blocks 201, 204.

Henceforth, for the sake of simplicity and without for this reason introducing any limitation, we shall refer to the case in which block 107 of FIG. 2 comprises, as represented in FIG. 2 both blocks 201 and 204.

The false colors correction block 201, which preferably precedes the purple fringing correction block 204, is such as to process the chrominance planes Cr and Cb to reduce or eliminate the so-called false colors, introduced into the image by the previous blocks of the apparatus 100, in particular by the color interpolation block 101. Advantageously the false colors correction block 201 is such as to process, pixel by pixel, all of the pixels of the chrominance planes Cb, Cr but modifying just the pixels affected by false color artifacts, also known as "false color pixels". Advantageously, such processing and such modification are modulated by information contained in the initial luminance plane Y.

In accordance with an embodiment, in the correction block 107 it is a decision block 202 is provided, suitable for receiving, as well as the initial luminance plane Y optionally subsampled by block 106 (if foreseen), the Cr, Cb chrominance planes as already filtered by the false colors correction block 201.

The decision block 202 is intended to establish, pixel by pixel, whether the purple fringing correction block 204 must be activated or not. In practice, the decision block 202 is such as to supply in output a control signal CS that through two multiplexers 203, 205, i.e., two selectors, provided in correction block 107, is such as to enable a bypass path 206 directed between the two multiplexers 203, 205 or an alternative path 207 that passes through the purple fringing correction block 204. Advantageously, both of the processing steps carried out through the false colors and purple fringing correction blocks 201, 204 are implemented through a mobile window approach, in which it is also possible to set different sizes of the windows for the two blocks 201, 204. This implies that the correction of a pixel is carried out based on information associated with pixels belonging to a neighboring area of limited size, or working window, of the pixel to be corrected.

It should also be observed that in the embodiment in which both the false colors correction block 201 and the purple fringing correction block 204 are provided, the pixel as corrected by the first 201 of the two blocks is immediately processed by the second 204 of the two blocks. Since the next pixel will be processed by the first 201 of the aforementioned blocks and then processed by the second 204 of the two blocks and so on, what has been stated above is equivalent to saying that the two corrections are almost integrated with each other, and it is as if in a single step formed by two consecutive sub-steps both of the corrections on a pixel were both carried out before moving on to the correction of the next pixel. It should also be observed that, in the case indicated above, since the working windows of the two blocks 201, 204 are centered on the same pixel there is an appreciable reduction in memory requirements.

Figure 3:
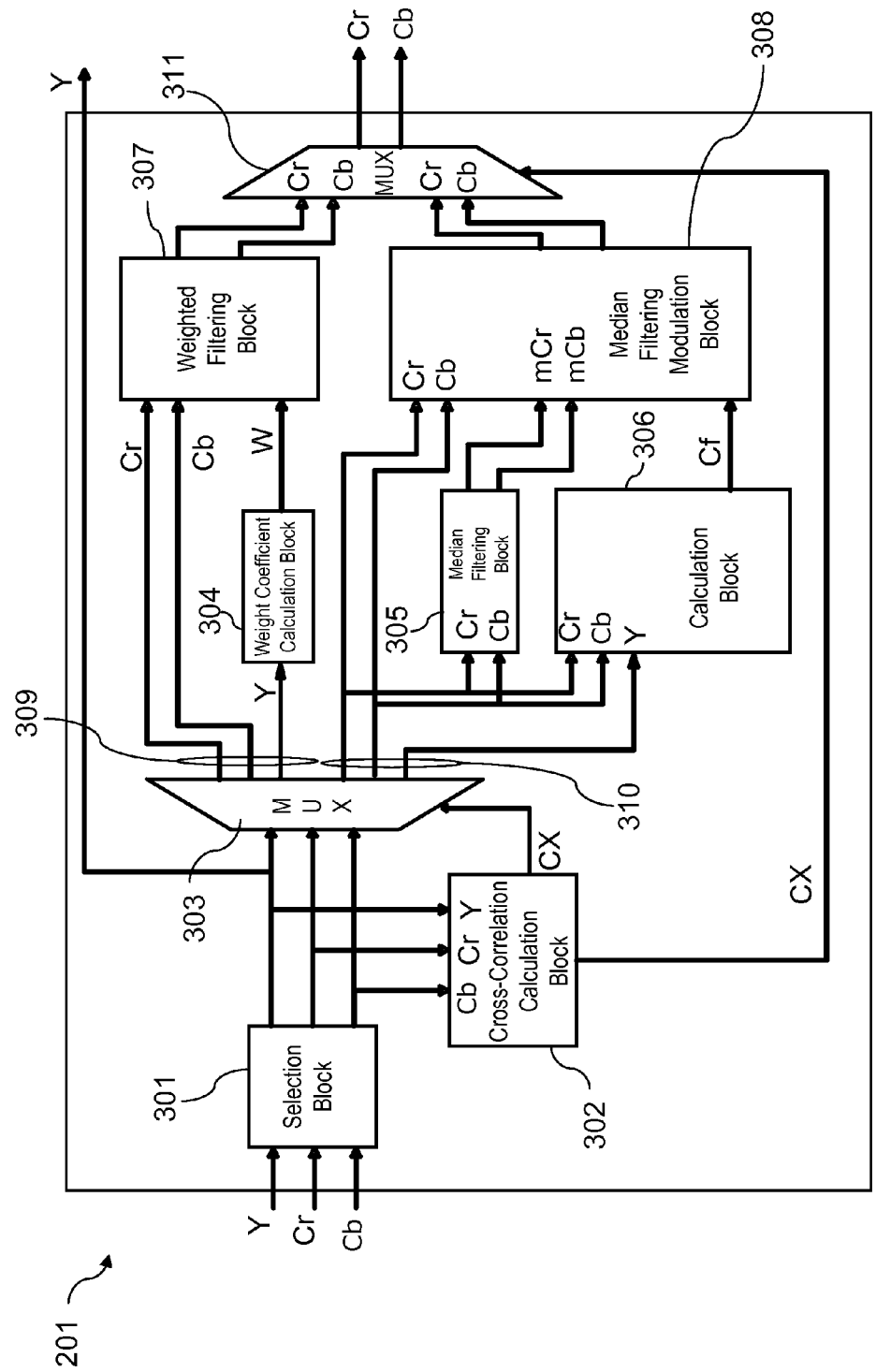
FIG. 3 shows an exemplary block diagram of a first sub-block of the correction block of FIG. 2.

With reference to FIG. 3, hereafter the false colors correction block 201 and the processing steps actuated through such a block shall be described in greater detail.

As already indicated before, the false colors are due to errors introduced into the Cr, Cb chrominance planes by the interpolation process. For this reason the correction block 201 is such as to modify just the Cr, Cb chrominance planes, whilst still taking into consideration the plane Y to carry out such a modification. In particular, advantageously, in the false colors correction block 201 filtering is carried out of the pixels of the Cr, Cb chrominance planes that are more accentuated the more evident are possible edges present in corresponding pixels belonging to the luminance plane Y. In this sense the processing carried out in such a correction block 201 makes use of information contained in the luminance plane Y.

In accordance with a currently preferred embodiment, inside the correction block 201 a selection block 301 of a working window, for example of dimensions N×N, associated with the pixel to be processed is provided.

In accordance with an embodiment, inside block 201 a median filtering is carried out to remove peaks or valleys from the Cr, Cb chrominance planes, since the variations that are often encountered in such planes are relatively soft, the filtering being such as to modify the Cr, Cb chrominance values of the pixel to be processed. As can be observed in FIG. 3, in the false colors correction block 201 a median filtering block 305 of the planes Cr and Cb is therefore provided, suitable for supplying in output for each pixel two chrominance values, mCr, mCb respectively, resulting from such median filtering on the working window associated with the pixel. The median filtering algorithms are generally known to men skilled in the art and therefore they shall not be described in greater detail in this document.

The Applicant has, however, observed that a median filtering is such as to introduce color bleeding artifacts at sharp colored edges. For this reason, it is advantageous to modify the Cr, Cb chrominance values of a pixel taking into account the local dynamic luminance and chrominance ranges, in order to avoid excessively reducing the chromaticity in regions with uniform colors. For this purpose, in accordance with an embodiment, in the false colors correction block 201 the strength of the median filtering is advantageously modulated based on the local dynamic chrominance and luminance ranges DCr, DCb and DY, i.e., calculated in an area around the pixel to be processed. In particular, such an area consists of the set of N×N pixels belonging to the working window. This advantageously makes it possible to not reduce the chromaticity too much in regions with uniform colors. This can be obtained for example by providing:

a calculation block 306 of a correction factor Cf, or modulation factor Cf, adapted to calculate such a factor Cf based on the aforementioned local dynamic ranges DCr, DCb, DY; and a median filtering modulation block 308 adapted to receive at input the initial values Cr, Cb of the pixel to be corrected, the chrominance values mCr, mCb as obtained in output from the median filtering block 305 and the correction factor Cf to modulate the strength of the median filtering based on the calculated correction factor Cf.

Inside the calculation block 306 of the correction factor Cf, the local dynamic ranges DCr, DCb and DY can for example be calculated, for each plane Cr, Cb, Y, as the difference between the maximum and minimum values of the pixels inside the working window, and in particular as:

$$DCr = \max_L(Cr) - \min_L(Cr) \quad (1)$$
$$DCb = \max_L(Cb) - \min_L(Cb)$$
$$DY = \max_L(Y) - \min_L(Y)$$

in which L is the working window associated with the pixel to be processed, for example of dimensions 5×5 pixels.

The correction factor Cf is advantageously calculated in such a way that at a sharp edge the filtering action is strong, so as to remove possible false colors around the aforementioned edge. On the other hand, if the edge in the luminance plane Y is weaker than both edges in the Cr, Cb chrominance planes it is advantageous to keep the filtering strength low. For this reason the correction factor Cf can be calculated as:

$$Cf = \begin{cases} DY & seDY = \min(DY, DCr, DCb) \\ \max(DY, DCr, DCb) & altrimenti \end{cases} \quad (2)$$

In accordance with an embodiment, inside the median filtering modulation block 308 the correction factor Cf, which in practice is a value between 0 and 255 for images with 8 bit resolution (per channel), therefore determines the strength of the false color correction on the Cr, Cb chrominance planes, preferably in accordance with the following formulae:

$$Cr = mCr + f(Cf) \cdot (Cr - mCr)$$
$$Cb = mCb + f(Cf) \cdot (Cb - mCb) \quad (3)$$

In which $f(x)$ is a function defined as:

$$f(x) = e^{-\frac{1}{2}\left(\frac{x}{\sigma}\right)^2} \quad (4)$$

in which $x \in [0,255]$ for images with 8 bit resolution (per channel).

It is clear to see that the formula (4) is such as to update each initial chrominance value Cr, Cb with a weighted average of the initial chrominance value Cr, Cb and of the value mCr, mCb obtained from the median filtering of the chrominance calculated in the working window of the pixel to be corrected. The weight coefficients depend upon the correction factor Cf through the formula $f(x)$. Taking into consideration the formulae (2),(4) it can therefore be observed that the correction factor Cf is calculated as a Gaussian function of a local dynamic range selected from the local dynamic luminance and chrominance ranges DY and DCr, DCb.

Such a formula represents the right hand part of a Gaussian function with an expected value equal to zero and standard deviation equal to σ. Such a function rapidly decreases as x increases. The value of σ determines the speed of approach to zero of the function $f(x)$.

With reference to the formula (4), it should be observed that low values of the correction factor Cf determine a greater contribution of the original value, i.e., initial chrominance value; on the other hand, high values of the correction factor Cf are associated with a greater weight than the result of the median filtering. Advantageously, the function $f(x)$ makes it possible to avoid discontinuous corrections as the dynamic range varies; in fact, such a formula makes it possible to vary with continuity proportions of the initial values and of the values resulting from the median filtering that contribute to the final value of the corrected pixel. This soft-threshold approach makes it possible to avoid sharp transitions between corrected and uncorrected pixels and obtain high-quality images.

In accordance with a particularly advantageous embodiment, as shown in FIG. 3, to avoid a possible drastic reduction in the saturation of genuine chrominance details introduced by the median filtering carried out by block 305 at a sharp edge, a calculation block of the cross-correlation 302 between the Cr, Cb chrominance planes is provided in the correction block 201 in order to detect an opposite correlation condition between the planes in the working window. Such an opposite correlation condition is indeed indicative of the presence of a sharp edge in the working window.

The cross-correlation calculation block 302 between the Cr, Cb chrominance planes is such as to supply in output a control signal CX that, in the case in which an opposite cross-correlation condition is detected, allows the top path 309 between a pair of multiplexers, or selectors, 303, 311 to be enabled. Such a top path 309 represents an alternative path to the bottom path 310 described above with reference to the blocks 305, 306, 308. In the opposite case, the latter bottom path 310 is enabled through the control signal CX.

In accordance with an embodiment, the correlation block is such as to evaluate whether one of the following conditions C1, C2 has been satisfied on the dynamic ranges:

C1) DCb<DY<DCr
  Y has the same trend as Cr
  Cb has the opposite trend to Cr
  DCr>g(maxv)
C2) DCr<DY<DCb
  Y has the same trend as Cb
  Cr has the opposite trend to Cb
  DCb>g(maxv)

In which maxv is the maximum value that can be assumed by a chrominance level Cr, Cb and in which in accordance with a currently preferred embodiment:

$$g(x) = \frac{1}{4}x.$$

If one of the above conditions C1, C2 is satisfied, this means that the luminance plane Y is correlated to the chrominance plane Cr or Cb that has the greater dynamic variation inside the working window (whereas in the other of the two chrominance planes it has different characteristics). For this reason, if one of the conditions C1 or C2 is satisfied, a chrominance edge is detected and the correction is not carried out following the path 310 but following the alternative path 309.

In the alternative path 309 a weight coefficient calculation block 304 and a weighted filtering block 307 are provided. Such weight coefficient calculation block 304 and weighted filtering block 307 operate in such a way that the Cr, Cb chrominance values of the pixel subjected to processing are modified to each assume a value equal to a weighted average of the respective Cr, Cb chrominance values of the pixels belonging to the working window N×N so that pixels having less luminance differences contribute more in such a weighted average than the pixel subjected to processing. For example, if k is the index of a generic pixel inside the working window N×N and if c is the index of the pixel to be processed, the filtered values in output from block 304 can be obtained as:

$$Cr = \sum_{k=1}^{N \times N} \frac{W_k}{\text{sum\_w}} \cdot Cr[k] \quad (5)$$

$$Cb = \sum_{k=1}^{N \times N} \frac{W_k}{\text{sum\_w}} \cdot Cb[k]$$

in which
Wk represents the weight coefficient associated with the k-th pixel of the working window and that can for example be calculated as $$W_k = \frac{1}{(Y[k] - Y[c] + 1)}; \text{ and} \quad (6)$$

$$\text{sum\_w} = \sum_{k=1}^{N \times N} W_k. \quad (7)$$

Moreover, in accordance with a particularly advantageous embodiment, the Cr, Cb chrominance values of the pixel to be corrected are actually corrected in block 307 only if for the remaining pixels of the working window at least one weight coefficient Wk is obtained having a greater value than a predetermined value, for example greater than 0.5. This condition makes it possible to avoid the condition where, if the luminance Y of the pixel to be corrected significantly differs from the luminances of the remaining pixels of the working window, the chrominance values Cr and Cb of the pixel are not correct in practice.

In accordance with a further embodiment, the processing carried out by the false colors correction block 201 is carried out in a pseudo-recursive mode. This is equivalent to saying that pixels already corrected by the false colors correction block 201 are used, as modified, to correct new pixels to be corrected. This embodiment requires greater memory use, but it has significantly increased performance with respect to a non-pseudo recursive implementation.

Going back to FIG. 2, as already stated earlier, the decision block 202 is intended to establish, based on the information contained in the planes Y, Cr and Cb whether the pixel subjected to correction must be subjected to the purple fringing correction operation carried out by block 204. In accordance with an embodiment, the decision block 202 is such as to evaluate whether in the working window there is at least one pixel, distinct from the pixel to be corrected, saturated with white. Such an evaluation is preferably carried out by comparing the luminance values Y of the pixels belonging to the working window, different to the pixel to be corrected, with a threshold value, which is for example set at about 210 for 8 bit images (per channel). If such a white-saturated pixel is not present, the correction according to the purple fringing correction block 204 is not carried out because through the control signal CS the by-pass path 206 is activated, directed between the two multiplexers 203 and 205. In the opposite case, the decision block 202 is such as to evaluate the purple degree of the pixel subjected to processing and its saturation. If such a purple degree exceeds a predetermined threshold and its saturation also exceeds a predetermined threshold the path 207 is enabled through the control signal CS and the pixel to be processed is subjected to correction processing carried out through the purple fringing correction block 204.

The purple degree of the pixel to be corrected can be calculated in the decision block 202 according to one of the many techniques that belong to the wealth of experience of a man skilled in the art. One of such techniques is, for example, described in patent application US 2006/0098253A.

Moreover, instead of calculating the individual purple degree of the pixel to be corrected, it is also possible to calculate an average purple degree mPD in an area around the pixel (for example of dimensions 3×3), wherein the average purple degree is obtained as a weighted average of the purple degrees calculated for each one of the area and in which the pixel to be corrected is associated with a higher weight coefficient.

If the purple degree, or the average purple degree, calculated in the decision block 202 is greater than zero, the pixel to be corrected is considered to belong to a purple fringing region. In this case the control signal CS allows the pathway 207 to be enabled to subject the aforementioned pixel to processing by the purple fringing correction block 204.

Figure 4:
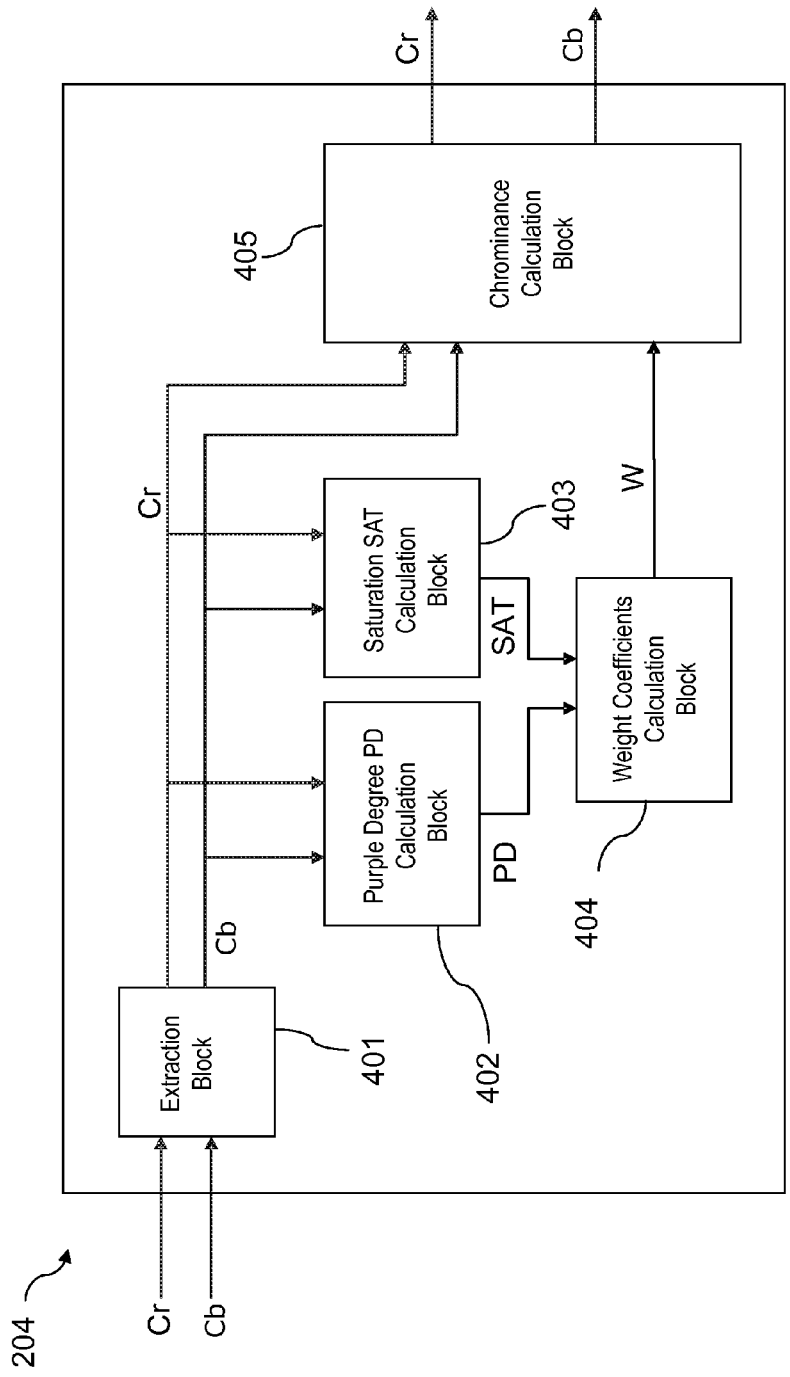
FIG. 4 shows an exemplary block diagram of a second sub-block of the correction block of FIG. 2.

With reference to FIG. 4, we shall now describe a first embodiment of the purple fringing correction block 204. Such a block 204 comprises an extraction block 401 of a working window. It should also be observed that the purple fringing correction is in this case carried out with a mobile window-based approach. In practice a mobile window is foreseen that processes one pixel at a time. Such a window can have a dimension suitable set based on the width of the purple fringing, and it can optionally have larger dimensions than those of the working window of the false colors correction block 201. The setting of the dimensions of the working window is very important in the purple fringing correction block 204. Indeed, although the adopted mobile window approach has the advantages of being simple and of requiring small memory resources, such an approach can have the drawback, in the case in which the width of the working window is too small, of not managing to identify all of the purple pixels close to overexposed regions. For this reason it is advantageous to set the dimensions of the working window in accordance with the width of the purple fringing. As known, the latter depends upon the system; in particular it is linked to the optics used, to the resolution, to the pixel size, etc.

In accordance with an embodiment, the purple fringing correction block 204 also comprises:
a block 402 for calculating the purple degree PD for each pixel of the working window;
a block 403 for calculating the saturation SAT for each pixel of the working window;
a weight coefficients calculation block 404 based on the calculated purple degree PD and saturation SAT values.

Preferably, the weight coefficients are calculated inside block 404 so that pixels having low saturation and low purple degree contribute more in the weighted average.

Inside the correction block 204 the purple fringing correction is in practice carried out by calculating the Cr, Cb chrominance values of the pixel to be corrected as a weighted average (based on the weight coefficients calculated by block 404) of the Cr, Cb chrominance values of the pixels belonging to the working window. For this purpose a block 405 for calculating the weighted average of such Cr, Cb chrominance values is foreseen. In accordance with an embodiment, what has been indicated above, can be obtained as detailed below.

Block 405 makes it possible to obtain, for each pixel p(x,y) to be processed, calculable chrominance values Cr(x,y) and Cb(x,y), for a working window having dimensions (2k+1)×(2k+1), as:

$$Cr(x, y) = \sum_{i,j \in M} \frac{W_{x+i,y+j}}{sum\_w} \cdot Cr(x+i, y+j) \quad (8)$$

$$Cbr(x, y) = \sum_{i,j \in M} \frac{W_{x+i,y+j}}{sum\_w} \cdot Cb(x+i, y+j)$$

in which:

$$sum\_w = \sum_{i,j \in M} W_{x+i,y+j} \quad (9)$$

$$M = \{-k, \ldots, k\}$$

the weight coefficients W can be calculated in block 404 as $$W_{x+i,y+j} = (maxval - SAT(x+i,y+j)+1) \cdot (1-PD(X+i,y+j)+1) \quad (10)$$

the saturation SAT values can be calculated in block 403 as $$SAT(x,y) = |Cr(x,y)-128| + |Cb(x,y)-128| \text{con } -i,j \in M = \{-k, \ldots, k\} \quad (11)$$

maxval is the maximum value that can be represented at a given bit depth.

The number 128 in the formula (11) refers to the case of an image with 8 bit resolution (per channel).

It should be observed that the aforementioned approach makes it possible to avoid an excessive reduction in saturation, which could lead to unpleasant results near to highly saturated regions. In the formula indicated above, if one of the factors is equal to zero, the addition of a unity avoids having the whole multiplication become equal to zero.

The provision to carry out a weighted average of the Cr, Cb chrominance values of the pixels belonging to the working window allows the purple fringing to be reduced gradually. The weighted average of the Cr, Cb chrominance values also allows the saturation near to highly saturated areas and not affected by purple fringing not to be excessively reduced, allowing more pleasing images to be produced.

As already indicated for the false colors correction block 210, also in the case of the purple fringing correction block 204 it is possible to foresee a pseudo-recursive approach.

Figure 5:
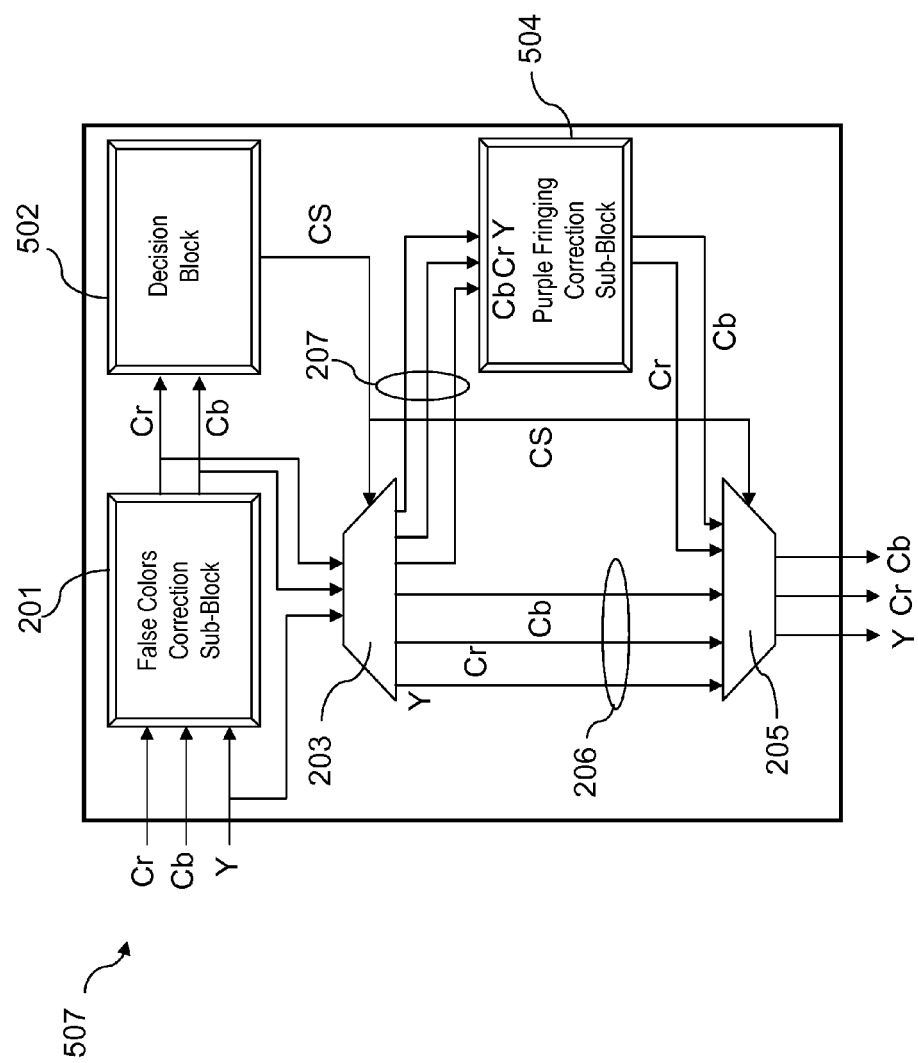
FIG. 5 shows an exemplary block diagram of the correction block of FIG. 1, in accordance with a second embodiment.

FIG. 5 shows a color artifacts correction block 507 in accordance with a possible variant embodiment. In the diagram of FIG. 1, block 507 of FIG. 5 replaces block 107 of FIG. 2.

Block 507 differs from block 107 essentially for the decision block 502 and for the purple fringing correction block 504.

As can be observed, in the variant embodiment of FIG. 5, the decision block 502 does not use the information of the luminance channel Y to decide whether a pixel must be subjected or not to the purple fringing correction implemented by block 504. In practice, this is equivalent to saying that a preliminary check is not carried out regarding the presence in the working window of white-saturated pixels and therefore of overexposed regions. In particular, in this embodiment the decision block 502 is such as to receive the Cr, Cb chrominance planes corrected by the false colors correction block 201 (which is the same one already described with reference to FIG. 3), to calculate the purple degree (or the average purple degree). Based on such a calculation a control signal CS is produced by block 502 that selectively enables one of the two paths 206 or 207, therefore regardless of how close the pixel to be processed is to overexposed regions.

Figure 6:
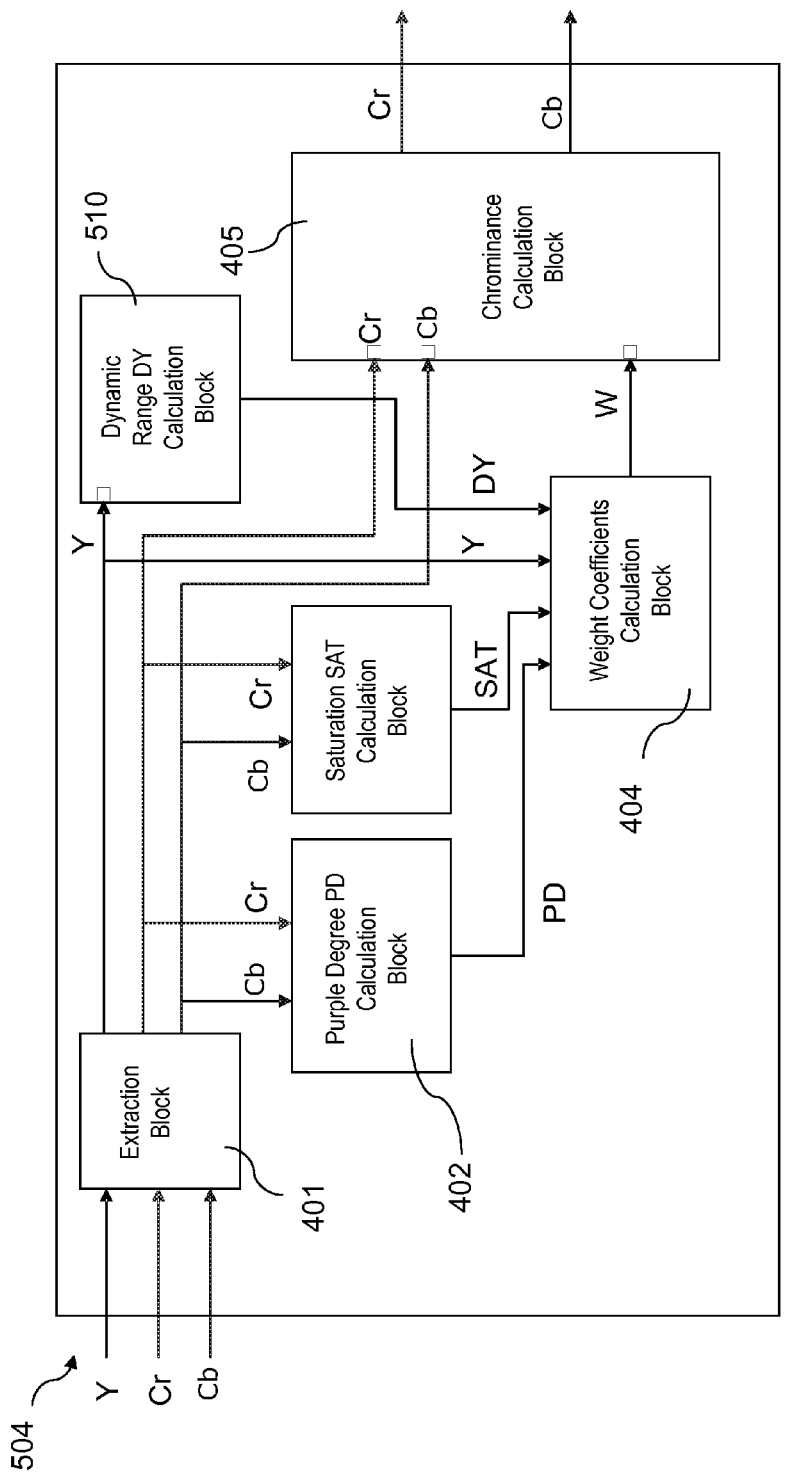
FIG. 6 shows an exemplary block diagram of a variant embodiment of the second sub-block of FIG. 4 adapted to be provided in the correction block of FIG. 5.

FIG. 6 represents the block diagram of the block purple fringing correction 504. This differs from the corresponding block 204 already described with reference to FIG. 4 in that in addition a block 510 for calculating the dynamic range DY within the working window is foreseen and in that the weight coefficients are calculated in block 404 so that such coefficients depend upon the saturation SAT, upon the purple degree PD of each pixel in the working window and also upon the luminosity of each pixel in relation to the dynamic luminosity range DY of the working window. More specifically, the weight coefficients are calculated so that pixels having low saturation SAT, low purple degree PD and high luminosity contribute more in the weighted average.

In practice, in this case the weight coefficients W can be calculated as:

$$W_{x+i,y+j} = (maxval - SAT(x+i, y+j) + 1) \cdot \\ (1 - PD(x+i, y+j) + 1) \cdot \left( \frac{Y(x+i, y+j) - minY}{maxY - maxY + 1} + 1 \right) \quad (12)$$

the saturation values SAT can be calculated in block 403 as $$SAT(x,y) = |Cr(x,y)-128| + |Cb(x,y)-128| \text{con } -i,j \in M = \{-k, \ldots, k\} \quad (13)$$

maxval is the maximum value that can be represented at a given bit depth.

The number 128 in the formula (13) refers to the case of an image with 8 bit resolution (per channel).

In accordance with the formula (12) indicated above, pixels having low saturation, low purple degree and high luminosity contribute more in the weighted average. In the formula indicated above, if one of the factors is equal to zero, the addition of a unity avoids having the whole multiplication become equal to zero.

Finally, it should be noted that the variant embodiment described above with reference to FIG. 6 makes it possible to avoid sharp transitions between corrected and uncorrected pixels when the size of the working window is smaller than the width of the purple fringing. It should be observed that in this embodiment the correction is carried out indiscriminately on all of the purple regions within an image.

One skilled in the art can bring numerous modifications and variants to the processing apparatus and method described above in order to satisfy contingent and specific requirements, all of which are in any case covered by the scope of protection of the disclosure as defined by the following claims and the equivalents thereof.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image-processing apparatus for processing a digital image in YCrCb color space, the image having an initial luminance plane Y and two initial Cr, Cb chrominance planes, the processing apparatus comprising:
a first block configured to receive in input the initial luminance plane Y of the digital image, to process the initial luminance plane Y, and provide a modified luminance plane Y in output;
a color artifact correction block configured to operate in parallel with the first block, the correction block configured to receive in input the initial planes Y, Cr, and Cb of the image, to modify the initial chrominance planes Cr and Cb through pixel-by-pixel processing with a mobile working window, the correction block including both a false colors correction sub-block and a purple fringing correction sub-block, the false colors correction sub-block and the purple fringing correction sub-block being configured to modify values of the initial Cr and Cb chrominance planes based on information contained in the initial Cr and Cb chrominance planes and also based on information contained in the initial luminance plane Y.

2. The processing apparatus according to claim 1, also comprising a sub-sampling block arranged in parallel with the first block and preceding the correction block and configured to provide sub-sampling of the initial luminance and chrominance planes Y and Cr, Cb before they are received at the correction block.

3. The processing apparatus according to claim 1 wherein the false colors correction sub-block includes:
a selection block configured to select a working window around a pixel to be corrected of the image;
a median filtering block configured to filter the planes Cr and Cb and output two filtered chrominance values mCr and mCb for each pixel to be corrected in the working window;
a median filtering modulation block configured to:
calculate dynamic luminance and chrominance ranges DY and DCr, DCb of the working window;
modulate a filtering strength of the median filtering block based on the dynamic luminance and chrominance ranges DY and DCr, DCb; and
cause the median filter block to provide a resulting filtering that is strong at a sharp edge of the image in the working window and relatively weak otherwise.

4. The processing apparatus according to claim 3, comprising a calculation block of a modulation coefficient configured to modulate the strength of the filtering by the median filtering modulation block, the calculation block configured to calculate the modulation coefficient as a Gaussian function of a selected one from the dynamic luminance and chrominance ranges DY and DCr, DCb.

5. The processing apparatus according to claim 3 wherein the false colors correction sub-block also includes:
a weighted filtering block configured to modify the chrominance values of the pixel to be processed by executing weighted averages of chrominance values of pixels belonging to the working window, the weighted averages being executed according to weight coefficients calculated so that more pixels of the window that have smaller luminance differences contribute to the weighted averages than the pixels to be processed; and
a cross-correlation block configured to detect an opposite correlation condition between the Cr, Cb chrominance planes based on the dynamic luminance and chrominance ranges, the cross-correlation block configured to supply an output control signal adapted to activate the weighted filtering block instead of the median filtering block and the modulation block in the case in which the opposite cross-correlation condition is detected or to activate the median filtering block and the modulation block otherwise.

6. The processing apparatus according to claim 1 wherein the correction block includes the purple fringing correction sub-block and a decision block configured to evaluate whether the pixel to be corrected must be processed or not by the purple fringing correction sub-block.

7. The processing apparatus according to claim 6 wherein the decision block is configured to execute the evaluation also based on information contained in the initial luminance plane Y, by evaluating whether in a working window associated with the pixel there is at least one pixel, distinct from the pixel to be corrected, saturated with white.

8. The processing apparatus according to claim 6 wherein the purple fringing correction block includes:
an extraction block of a working window for each pixel to be corrected;
a purple degree calculation block for each pixel belonging to the working window;
a saturation calculation block of each pixel of the working window;
a weight coefficients calculation block based on the calculated purple degree and saturation values, the weight coefficients calculation block configured to calculate weight coefficients so that pixels of the working window having low saturation and low purple degree are associated with greater weights;
a weighted average filtering block configured to associate with the pixels the chrominance values obtained as weighted averages, calculated based on the weight coefficients, of chrominance values of the pixels belonging to the working window.

9. A digital image acquisition and processing system, comprising:
a digital image processing apparatus that includes:
a first block configured to receive in input an initial luminance plane Y of a digital image and to process and modify the initial luminance plane Y in order to provide a modified luminance plane Y in output;
a sub-sampling block, arranged in parallel with the first block, configured to sub-sample the initial luminance and chrominance planes Y and Cr, Cb;
a color artifact correction block, configured to operate in parallel with the first block and which is after the sub-sampling block, the correction block configured to receive in input the initial planes Y, Cr, Cb of the image, to modify the initial chrominance planes Cr and Cb through a pixel-by-pixel processing approach with a mobile working window, the correction block including both a false colors correction sub-block and a purple fringing correction sub-block, each sub-block configured to modify values of the initial Cr, Cb chrominance planes based on information contained in the initial Cr, Cb chrominance planes and also based on information contained in the initial luminance plane Y.

10. The system of claim 9 wherein the correction block comprises the false colors correction sub-block, the false colors correction sub-block including:
- a selection block configured to select a working window around a pixel to be corrected of the image;
- a median filtering block configured to filter the planes Cr and Cb and output two filtered chrominance values mCr and mCb for each pixel to be corrected in the working window;
- a median filtering modulation block configured to:
  - calculate dynamic luminance and chrominance ranges DY and DCr, DCb of the working window;
  - modulate a filtering strength of the filtering based on the dynamic luminance and chrominance ranges DY and DCr, DCb; and
  - cause the median filter block to provide a resulting filtering that is relatively strong at a sharp edge of the image in the working window and relatively weak otherwise.

11. The system of claim 10 wherein the false colors correction sub-block also includes:
- a weighted filtering block configured to modify the chrominance values of the pixel to be processed by executing weighted averages of chrominance values of pixels belonging to the working window, the weighted averages being executed according to weight coefficients calculated so that more pixels of the window that have smaller luminance differences contribute to the weighted averages than the pixels to be processed; and
- a cross-correlation block configured to detect an opposite correlation condition between the Cr, Cb chrominance planes based on the dynamic luminance and chrominance ranges, the cross-correlation block configured to supply an output control signal adapted to activate the weighted filtering block instead of the median filtering block and the modulation block in the case in which the opposite cross-correlation condition is detected or to activate the median filtering block and the modulation block otherwise.

12. An image processing method for processing a digital image in YCrCb color space, the image comprising an initial luminance plane Y and two initial Cr, Cb chrominance planes, the method comprising:
- processing the luminance plane Y to produce a modified luminance plane Y; and
- correcting color artifacts, executed in parallel with the processing of the luminance plane Y and to modify the chrominance planes Cr and Cb, in accordance with a pixel-by-pixel processing approach with a mobile working window, the correction step including both a false colors correction and a purple fringing correction, the modifying the values of the initial Cr, Cb chrominance planes is based on information contained in the initial Cr, Cb chrominance planes and also based on information contained in the initial luminance plane Y.

13. The processing method according to claim 12, also comprising a sub-sampling, executed in parallel with the luminance plane Y processing and that precedes the correcting color artifacts, wherein an operation of sub-sampling the initial luminance and chrominance planes Y and Cr, Cb is executed before they are processed in the correction of the false colors and the purple fringing.

14. The processing method according to claim 12 wherein the correction includes the purple fringing correction and a decision configured to evaluate for each pixel to be corrected whether the pixel to be corrected must be processed or not in accordance with the purple fringing correction.

15. The processing method according to claim 14 wherein the decision is configured to execute the evaluation based on information contained in the initial luminance plane Y, and to evaluate whether in a working window associated with the pixel there is at least one pixel, distinct from the pixel to be corrected, saturated with white.

16. The processing method according to claim 14 wherein the purple fringing correction includes:
- extracting a working window for each pixel to be corrected;
- calculating a purple degree for each pixel of the working window;
- calculating a saturation for each pixel of the working window;
- calculating weight coefficients based on the calculated purple degree and saturation values, wherein weight coefficients are calculated so that pixels of the working window having low saturation and low purple degree are associated with a greater weight; and
- weighted average filtering to associate the pixels having chrominance values obtained as weighted averages, calculated based on the weight coefficients, with chrominance values of the pixels belonging to the working window.

17. A non-transitory computer readable memory containing contents that are configured to cause a computing device to implement a method comprising:
- processing the luminance plane Y to produce a modified luminance plane Y;
- correcting color artifacts, executed in parallel with the first step to modify the chrominance planes Cr and Cb, in accordance with a pixel-by-pixel processing approach with a mobile working window, including both a false colors correction and a purple fringing correction that are configured to modify the values of the initial Cr, Cb chrominance planes based on information contained in the initial Cr, Cb chrominance planes and also based on information contained in the initial luminance plane Y; and
- a sub-sampling initial luminance and chrominance planes Y and Cr, Cb, executed in parallel with the processing the luminance plane Y and before correcting color artifacts.

18. The non-transitory computer readable memory of claim 17 wherein the correcting color artifacts includes the false colors correction, the false colors correction including:
- selecting a working window around a pixel to be corrected of the image;
- executing a median filtering of the planes Cr and Cb to supply two filtered chrominance values mCr, mCb in output for such a pixel to be corrected;
- modulating the median filtering to modulate the strength of the median filtering based on dynamic luminance and chrominance ranges DY and DCr, DCb, calculated over the working window, the step of modulating the median filtering being configured to modulate the filtering so as to determine a resulting filtering that is strong at a sharp edge of the image in the working window and relatively weak otherwise.

19. The non-transitory computer readable memory of claim 18 wherein the false colors correction also includes:
- detecting a cross correlation to detect an opposite correlation condition between the Cr, Cb chrominance planes based on the dynamic ranges; and
- weighted filtering to modify the chrominance values of the pixel to be corrected by executing weighted averages of chrominance values of pixels belonging to the working window, the weighted averages being executed according to weight coefficients calculated so that more pixels of the window that have smaller luminance differences contribute in the averages than the pixels to be corrected; and wherein the detecting a cross correlation is configured to supply a control signal in output to enable the weighted filtering instead of the median filtering and the filtering modulating if the opposite cross-correlation condition is detected and to enable the median filtering step and the modulation step otherwise.

20. An image-processing apparatus for processing a digital image in YCrCb color space, the image having an initial luminance plane Y and two initial Cr, Cb chrominance planes, the processing apparatus comprising:

a first block configured to receive in input the initial luminance plane Y of the digital image, to process the initial luminance plane Y, and provide a modified luminance plane Y in output;

a color artifact correction block configured to operate in parallel with the first block, the correction block configured to receive in input the initial planes Y, Cr, and Cb of the image, to modify the initial chrominance planes Cr and Cb through pixel-by-pixel processing with a mobile working window, the correction block including a false colors correction sub-block, the false colors correction sub-block configured to modify values of the initial Cr and Cb chrominance planes based on information contained in the initial Cr and Cb chrominance planes and also based on information contained in the initial luminance plane Y, the false colors correction sub-block including:

a selection block configured to select a working window around a pixel to be corrected of the image;

a median filtering block configured to filter the planes Cr and Cb and output two filtered chrominance values mCr and mCb for each pixel to be corrected in the working window;

a median filtering modulation block configured to:
calculate dynamic luminance and chrominance ranges DY and DCr, DCb of the working window;
modulate a filtering strength of the median filtering block based on the dynamic luminance and chrominance ranges DY and DCr, DCb; and
cause the median filter block to provide a resulting filtering that is strong at a sharp edge of the image in the working window and relatively weak otherwise.

21. The processing apparatus according to claim 20, comprising a calculation block of a modulation coefficient configured to modulate the strength of the filtering by the median filtering modulation block, the calculation block configured to calculate the modulation coefficient as a Gaussian function of a selected one from the dynamic luminance and chrominance ranges DY and DCr, DCb.

22. The processing apparatus according to claim 20 wherein the false colors correction sub-block also includes:

a weighted filtering block configured to modify the chrominance values of the pixel to be processed by executing weighted averages of chrominance values of pixels belonging to the working window, the weighted averages being executed according to weight coefficients calculated so that more pixels of the window that have smaller luminance differences contribute to the weighted averages than the pixels to be processed; and a cross-correlation block configured to detect an opposite correlation condition between the Cr, Cb chrominance planes based on the dynamic luminance and chrominance ranges, the cross-correlation block configured to supply an output control signal adapted to activate the weighted filtering block instead of the median filtering block and the modulation block in the case in which the opposite cross-correlation condition is detected or to activate the median filtering block and the modulation block otherwise.

23. An image-processing apparatus for processing a digital image in YCrCb color space, the image having an initial luminance plane Y and two initial Cr, Cb chrominance planes, the processing apparatus comprising:

a first block configured to receive in input the initial luminance plane Y of the digital image, to process the initial luminance plane Y, and provide a modified luminance plane Y in output;

a color artifact correction block configured to operate in parallel with the first block, the correction block configured to receive in input the initial planes Y, Cr, and Cb of the image, to modify the initial chrominance planes Cr and Cb through pixel-by-pixel processing with a mobile working window, the correction block including a purple fringing correction sub-block and a decision block, the decision block configured to evaluate whether the pixel to be corrected must be processed or not by the purple fringing correction sub-block, the purple fringing correction sub-block being configured to modify values of the initial Cr and Cb chrominance planes based on information contained in the initial Cr and Cb chrominance planes and also based on information contained in the initial luminance plane Y, the purple fringing correction block including:

an extraction block of a working window for each pixel to be corrected;

a purple degree calculation block for each pixel belonging to the working window;

a saturation calculation block of each pixel of the working window;

a weight coefficients calculation block based on the calculated purple degree and saturation values, the weight coefficients calculation block configured to calculate weight coefficients so that pixels of the working window having low saturation and low purple degree are associated with greater weights;

a weighted average filtering block configured to associate with the pixels the chrominance values obtained as weighted averages, calculated based on the weight coefficients, of chrominance values of the pixels belonging to the working window.

24. The processing apparatus according to claim 23, comprising a calculation block of a modulation coefficient configured to modulate the strength of the filtering by the median filtering modulation block, the calculation block configured to calculate the modulation coefficient as a Gaussian function of a selected one from the dynamic luminance and chrominance ranges DY and DCr, DCb.

25. The processing apparatus according to claim 23 wherein the decision block is configured to execute the evaluation also based on information contained in the initial luminance plane Y, by evaluating whether in a working window associated with the pixel there is at least one pixel, distinct from the pixel to be corrected, saturated with white.

26. An image processing method for processing a digital image in YCrCb color space, the image comprising an initial luminance plane Y and two initial Cr, Cb chrominance planes, the method comprising:

processing the luminance plane Y to produce a modified luminance plane Y; and correcting color artifacts, executed in parallel with the processing of the luminance plane Y and to modify the chrominance planes Cr and Cb, in accordance with a pixel-by-pixel processing approach with a mobile working window, the correction step including:
a purple fringing correction, and the modifying the values of the initial Cr, Cb chrominance planes is based on information contained in the initial Cr, Cb chrominance planes and also based on information contained in the initial luminance plane Y, the purple fringing correction including:
extracting a working window for each pixel to be corrected;
calculating a purple degree for each pixel of the working window;
calculating a saturation for each pixel of the working window;
calculating weight coefficients based on the calculated purple degree and saturation values, wherein weight coefficients are calculated so that pixels of the working window having low saturation and low purple degree are associated with a greater weight; and
weighted average filtering to associate the pixels having chrominance values obtained as weighted averages, calculated based on the weight coefficients, with chrominance values of the pixels belonging to the working window; and
a decision configured to evaluate for each pixel to be corrected whether the pixel to be corrected must be processed or not in accordance with the purple fringing correction.

27. The processing method according to claim 26 wherein the decision is configured to execute the evaluation based on information contained in the initial luminance plane Y, and to evaluate whether in a working window associated with the pixel there is at least one pixel, distinct from the pixel to be corrected, saturated with white.

28. The processing method according to claim 26 wherein the purple fringing correction includes:
calculating a dynamic luminance range inside the working window;
calculating weight coefficients based on the purple degree values, based on the saturation SAT values, and based on the dynamic luminance range DY, wherein the weight coefficients are calculated so that pixels of the working window having low saturation, low purple degree, and high luminance in relation to the dynamic luminance range DY are associated with a greater weight; and
weighted average filtering to associate the pixels having chrominance values obtained as weighted averages, calculated based on the weight coefficients, with chrominance values of the pixels belonging to the working window.

29. A non-transitory computer readable memory containing contents that are configured to cause a computing device to implement a method comprising:
processing the luminance plane Y to produce a modified luminance plane Y;
correcting color artifacts, executed in parallel with the first step to modify the chrominance planes Cr and Cb, in accordance with a pixel-by-pixel processing approach with a mobile working window, including a false colors correction configured to modify the values of the initial Cr, Cb chrominance planes based on information contained in the initial Cr, Cb chrominance planes and also based on information contained in the initial luminance plane Y, the false colors correction including:
selecting a working window around a pixel to be corrected of the image;
executing a median filtering of the planes Cr and Cb to supply two filtered chrominance values mCr, mCb in output for such a pixel to be corrected; and
modulating the median filtering to modulate the strength of the median filtering based on dynamic luminance and chrominance ranges DY and DCr, DCb, calculated over the working window, the step of modulating the median filtering being configured to
modulate the filtering so as to determine a resulting filtering that is strong at a sharp edge of the image in the working window and relatively weak otherwise; and
a sub-sampling initial luminance and chrominance planes Y and Cr, Cb, executed in parallel with the processing the luminance plane Y and before correcting color artifacts.

30. The non-transitory computer readable memory of claim 29 wherein the false colors correction also includes:
detecting a cross correlation to detect an opposite correlation condition between the Cr, Cb chrominance planes based on the dynamic ranges; and
weighted filtering to modify the chrominance values of the pixel to be corrected by executing weighted averages of chrominance values of pixels belonging to the working window, the weighted averages being executed according to weight coefficients calculated so that more pixels of the window that have smaller luminance differences contribute in the averages than the pixels to be corrected; and
wherein the detecting a cross correlation is configured to supply a control signal in output to enable the weighted filtering instead of the median filtering and the filtering modulating if the opposite cross-correlation condition is detected and to enable the median filtering step and the modulation step otherwise.

* * * * *